United States Patent [19]

Faroudja et al.

[11] Patent Number: 5,940,141
[45] Date of Patent: Aug. 17, 1999

[54] NONLINEAR VERTICAL BANDWIDTH EXPANSION OF VIDEO SIGNALS

[75] Inventors: Yves C. Faroudja, 26595 Anacapo Dr., Los Altos Hills, Calif. 94022; Peter D. Swartz, San Jose, Calif.

[73] Assignee: Yves C. Faroudja, Los Altos Hills, Calif.

[21] Appl. No.: 08/855,076

[22] Filed: May 13, 1997

Related U.S. Application Data

[63] Continuation of application No. 08/561,660, Nov. 22, 1995, abandoned, which is a continuation-in-part of application No. 08/539,815, Oct. 5, 1995, abandoned

[60] Provisional application No. 60/005,114, Oct. 12, 1995, and provisional application No. 60/004,905, Oct. 6, 1995.

[51] Int. Cl.$^6$ .................................................. H04N 5/21
[52] U.S. Cl. ............................. 348/628; 348/625; 348/631
[58] Field of Search ..................................... 348/446, 448, 348/445, 458, 628, 629, 630, 631, 625, 606; H04N 7/61, 5/21

[56] References Cited

U.S. PATENT DOCUMENTS

| | | |
|---|---|---|
| 2,740,071 | 3/1956 | Goldmark et al. . |
| 2,851,522 | 9/1958 | Hollywood . |
| 4,030,121 | 6/1977 | Faroudja . |
| 4,179,705 | 12/1979 | Faroudja . |
| 4,240,105 | 12/1980 | Faroudja . |
| 4,262,304 | 4/1981 | Faroudja . |
| 4,504,853 | 3/1985 | Faroudja . |
| 4,531,151 | 7/1985 | Hentschke . |
| 4,706,112 | 11/1987 | Faroudja et al. . |

(List continued on next page.)

FOREIGN PATENT DOCUMENTS

| | | |
|---|---|---|
| 0318760 | 11/1988 | European Pat. Off. . |
| 0408460 | 7/1990 | European Pat. Off. . |
| 9512275 | 5/1995 | WIPO . |
| 9512283 | 5/1995 | WIPO . |

OTHER PUBLICATIONS

"High Definition Television Studies on Compatible Basis with Present Standards" B. Wendland; *Television Technology in the 80's* Feb. 1981 pp. 151–165.

"Picture Enhancement for PAL–coded TV Signals by Digital Processing in TV Receivers," Michael Jacobsen; *SMPTE Journal*, Feb. 1983, pp. 164–169.

"High–Definition Television and Compatibility with Existing Standards" C.P. Sandbank, M.E.B. Moffat; *SMPTE Journal*, May 1983 Part 1, pp. 552–561.

(List continued on next page.)

*Primary Examiner*—Michael Lee
*Attorney, Agent, or Firm*—Gallagher & Lathrop; Thomas A. Gallagher

[57] ABSTRACT

(1) The analog or digital components (such as RGB, Y/I/Q, Y/U/V, Y/R-Y/B-Y, Y/Cr/Cb, etc.) of a compatible standard-bandwidth 2-1 interlaced television signal, an analog signal, such as a standard NTSC or PAL television signal or a standard format digital signal, such as a digital representation of a standard NTSC or PAL television signal or a digital video signal in one of the 2:1 interlaced CCIR 601 hierarchical formats, is converted from interlaced to progressive scan, the progressive scan frame rate corresponding to the interlaced scan field rate and each progressively scanned frame having twice as many scan lines as in each interlaced field, the conversion often referred to as "line doubling;" (2) the line rate of the progressively scanned signal is increased by interpolation, including appropriate postfiltering (if the line rate of the progressively scanned signal is doubled, the overall effect is often referred to as "line quadrupling" or "line tripling" when the progressively scanned signal scan rate is multiplied by 1.5); and (3) the resulting signal is spectrally expanded in the vertical domain. Vertical bandwidth enhancement simulates a wide bandwidth vertical detail signal. The vertical detail signal is self-derived from the processed compatible signal itself.

7 Claims, 11 Drawing Sheets

U.S. PATENT DOCUMENTS

| | | |
|---|---|---|
| 4,772,949 | 9/1988 | Nadan . |
| 4,847,681 | 7/1989 | Faroudja et al. . |
| 4,864,389 | 9/1989 | Faroudja et al. . |
| 4,876,596 | 10/1989 | Faroudja . |
| 4,893,176 | 1/1990 | Faroudja . |
| 4,916,526 | 4/1990 | Faroudja et al. . |
| 4,967,271 | 10/1990 | Cambell et al. . |
| 4,982,280 | 1/1991 | Lyon et al. . |
| 4,989,090 | 1/1991 | Campbell et al. . |
| 5,014,119 | 5/1991 | Faroudja . |
| 5,016,103 | 5/1991 | Rabii . |
| 5,151,783 | 9/1992 | Faroudja . |
| 5,159,451 | 10/1992 | Faroudja et al. . |
| 5,168,358 | 12/1992 | Ishizu et al. . |
| 5,237,414 | 8/1993 | Faroudja . |
| 5,291,280 | 3/1994 | Faroudja et al. . |
| 5,400,077 | 3/1995 | Cookson et al. . |
| 5,428,398 | 6/1995 | Faroudja ............................ 348/452 |
| 5,473,381 | 12/1995 | Lee ..................................... 348/411 |
| 5,497,199 | 3/1996 | Asada et al. ....................... 348/446 |

OTHER PUBLICATIONS

"Compatible Systems for High–Quality Television" R.N. Jackson, M.J. Annegarn; *SMPTE Journal*, Jul. 1983, pp. 719–723.

"Extended Definition Television with High Picture Quality" Broder Wendlund; *SMPTE Journal*, Oct. 1983, pp. 1028–1035.

"Signal Processing for New HQTV Systems" Broder Wendland, Hartmut Schröder; Television Image Quality, *SMPTE Journal*, Scarsdale, 1984, pp. 336–353.

"The Evolution of High–Definition Television" John P. Freeman; *SMPTE Journal*, May 1984 Part 1, pp. 492–501.

"On Picture Quality of Some Television Signal Processing Techinques" Broder Wendland, Hartmut Schröder; *SMPTE Journal*, Oct. 1984, pp. 915–922 (cited in specification).

"Experiments on Proposed Extended–Definition TV with Full NTSC Compatibility" Takahiko Fukinuki, Yasuhiro Hirano, Hiroshi Yoshigi; *SMPTE Journal*, Oct. 1984, pp. 923–929.

"Scanning Modes for Flicker–Free Colour TV–Reproduction" H. Schroder, M. Silverberg, B. Wendland, G. Huerknamp; *IEEE Transactions on Consumer Electronics* 1985, pp. 627–641.

"Signal Processing for New HQTV Systems" Broder Wendland, Hartmut Schröder; *SMPTE Journal* Feb. 1985, pp. 182–189.

"The Kell Factor: Past and Present" Stephen C. Hsu; *SMPTE Journal*, Feb. 1986, pp. 206–214.

"Improving NTSC to Achieve Near–RGB Performance" Yves Faroudja, Joseph Roizen; *SMPTE Journal*, Aug. 1987, pp. 750–761.

"A Proposal for a New High–Definition NTSC Broadcast Protocol" Richard Iredale; *IEEE Transactions on Consumer Electronics*, Feb. 1987, pp. 14–27.

"NTSC and Beyond," Yves Faroudja; *IEEE Transactions on Consumer Electronics*, Feb. 1988, pp. 166–177.

"NTSC Y/C Separation and Enhancement Technique with Two Dimensional Adaptive Features" M. Itoga, H. Itoh, T. Kasezawa, M. Yao; *IEEE Transactions on Consumer Electronics*, Feb. 1988, pp. 194–204.

"Enhancing Television—An Evolving Scene" John L. E. Baldwin; *SMPTE Journal*, May 1988, pp. 374–377.

"Improving TV Picture Quality with Linear–Median Type Operations" J. Salo, Y. Neuvo, V. Hameenaho; *IEEE Transactions on Consumer Electronics*, Aug. 1988 pp. 373–379.

"A Practical IDTV System Improving Picture Quality for Nonstandard TV Signals" Toshiyuki Kurita, I. Arai, N. Nakagaki, T. Murata; *IEEE Transactions on Consumer Electronics*, Aug. 1988 pp. 387–396.

"Integrated Digital IDTV Receiver with Features" S. Naimpally, et al.; *IEEE Transactions on Consumer Electronics*, Aug. 1988 pp. 410–419.

"3XNTSC–A 'Leapfrog' Production Standard for HDTV" Wayne Bretl; *IEEE Transactions on Consumer Electronics* Aug. 1988 pp. 484–492.

"System & Technological Details of Terrestrial/Cable NTSC Compatible HDTV" Alan Cavallerano; *IEEE Transactions on Consumer Electronics*, Aug. 1989 pp. 227–238.

"Comparison Between Median Filtering and Vertical Edge Controlled Interpolation for Flicker Reduction" Dipl. Ing C. Hentschel; *IEEE Transactions on Consumer Electronics* Aug. 1989 pp. 279–289.

"A Progress Report on Improved NTSC," Yves C. Faroudja, Joseph Roizen; *SMPTE Journal*, Nov. 1989, pp. 817–822.

"NTSC Image Improvements Using Basic Inter and Intra/ Frame Signal Processing" Carl Markhauser; *IEEE Transactions on Consumer Electronics*, Nov. 1989, pp. 863–871.

*Systems Description SuperNTSC*, Faroudja Research Enterprises; Mar. 1990 Section I, II, IV,& V.

"Motion Adaptive Field Rate Upconversion Algorithms for 900 Lines/100 Hz/2:1 Displays" David Gillies, Martin Plantholt, Dietrich Westerknamp; *IEEE Transactions on Consumer Electronics*, May 1990 pp. 149–160.

"High–Definition Transmission, Signal Processing and Display," William Glenn, Karen Glenn; *SMPTE Journal*, Jul. 1990, pp. 538–541.

"ATV/NTSC Format Converters" W. Bretl; *IEEE Transactions on Consumer Electronics*, Aug. 1990 pp. 269–283.

"An Interlaced to Progressive Scan Converter for Improved Pal Systems" A. Biasiolo, G. Cortelazzo, G. Mian; *IEEE Transactions on Consumer Electronics*, Aug. 1990 pp. 284–290.

"Video Tape Recorder with Digital Television Standards Converter" M. Tomita, T. Ohtsuki, S. Ogata, H. Niwa; *IEEE Transactions on Consumer Electronics*, Aug. 1990 pp. 572–579.

"Line Rate Upconversion in IDTV Applications" Pasi Pohjala, Matti Karlsson; *IEEE Transactions on Consumer Electronics*, Aug. 1991 pp. 309–312.

"Multi–Picture Systems for High Resolution Wide Aspect Ratio Screen" Susumu Tsuchida, Chisato Yoshida; *IEEE Transactions on Consumer Electronics*, Aug. 1991 pp. 313–319.

"Interlace to Progressive Scan Converter for IDTV" P. Filliman, T. Christopher, R. Keen; *IEEE Transactions on Consumer Electronics*, Aug. 1992 pp. 135–144.

"A Motion–Adaptive De–Interlacing Method" Soon–kak Kwon, Kang–soo Seo, Jae–kyoon Kim, Yung–gil Kim; *IEEE Transactions on Consumer Electronics*, Aug. 1992 pp. 145–150.

"Development of Picture Converting System Applying an NTSC Signal to a Wide Aspect Display" Kenji Katsumata, et al.; *IEEE Transactions on Consumer Electronics*, Aug. 1992 pp. 303–312.

"Muse–525 Progressive Scan Converter" Hiroyuki Nakayama, Yoshiki Mizutani, Hiroshi Yamamoto; *IEEE Transactions on Consumer Electronics*, Aug. 1992 pp. 313–318.

"A Study of Interpolation Filter for Muse Decoder" N. Itoh et al.; *IEEE Transactions on Consumer Electronics*, Aug. 1992 pp. 563–569.

"Digital Compatible HDTV Using Upconverted NTSC Video" Paul Snopko, Jong Kim; *SMPTE Journal*, Mar. 1993, pp. 186–189.

"Scan Conversion Between 1050 2:1 60 HZ and 525 1:1 30 HZ U and V Color Components" Eberhard Fisch; *IEEE Transactions on Consumer Electronics*, Aug. 1993 pp. 210–218.

"Video Format Conversions Between HDTV Systems" Dong–Ho Lee, Jong–Seok Park, Yung–Gil Kim; *IEEE Transactions on Consumer Electronics*, Aug. 1993 pp. 219–224.

"A Deinterlacer for IQTV Receivers and Multimedia Applications" R. Simonetti, et al. *IEEE Transactions on Consumer Electronics*, Aug. 1993 pp. 234–240.

"Interlaced to Progressive Scan Conversion With Double Smoothing" H. Hwang, M. Lee, D. Song; *IEEE Transactions on Consumer Electronics*, Aug. 1993 pp. 241–246.

"A Digital Display Processor with Integrated 9 Bit Triple DAC for Enhanced TV Applications" Hubert Pernull, Dieter Draxelmayr; *IEEE Transactions on Consumer Electronics* Aug. 1993 pp. 247–254.

"A New Algorithm for Interlaced to Progressive Scan Conversion Based on Directional Correlations and Its IC Design" Myeong–Hwan Lee, et al.; *IEEE Transactions on Consumer Electronics* May 1994 pp. 119–129.

"High Resolution Muse–NTSC Converter" H. Nakayama, E. Arita, Y. Mizutani, K. Tsunashima; *IEEE Transactions on Consumer Electronics* Aug. 1994 pp. 199–206.

"A Palplus Compatible HDTV Encoder System" G. Shmidt, L.S. Dooley, W.P. Buchwald, *IEEE Transactions on Consumer Electronics* Aug. 1994 pp. 207–215.

"An NTSC to HDTV Video Conversion System by Using the Block Processing Concept" Shih–Chang Hsia, et al.; *IEEE Transactions on Consumer Electronics*, Aug. 1994, pp. 216–224.

"Edge and Motion Controlled Spatial Upconversion" Jouni Salonen; *IEEE Transactions on Consumer Electronics*, Aug. 1994, pp. 225–233.

"A Highly Integrated Scanning Rate Converter for IQTV" V. D'Alto et al.; *IEEE Transactions on Consumer Electronics*, Aug. 1994, pp. 727–734.

"Motion Adaptive Deinterlacer for DMD (Digital Micromirror Device) Based Digital Television" V. Markandey, et al.; *IEEE Transactions on Consumer Electronics*, Aug. 1994 pp. 735–740.

"Subjective Assessment of Various Methods for Scan Conversion" Christian Hentschel; *IEEE Transactions on Consumer Electronics*, Feb. 1995 pp. 65–72.

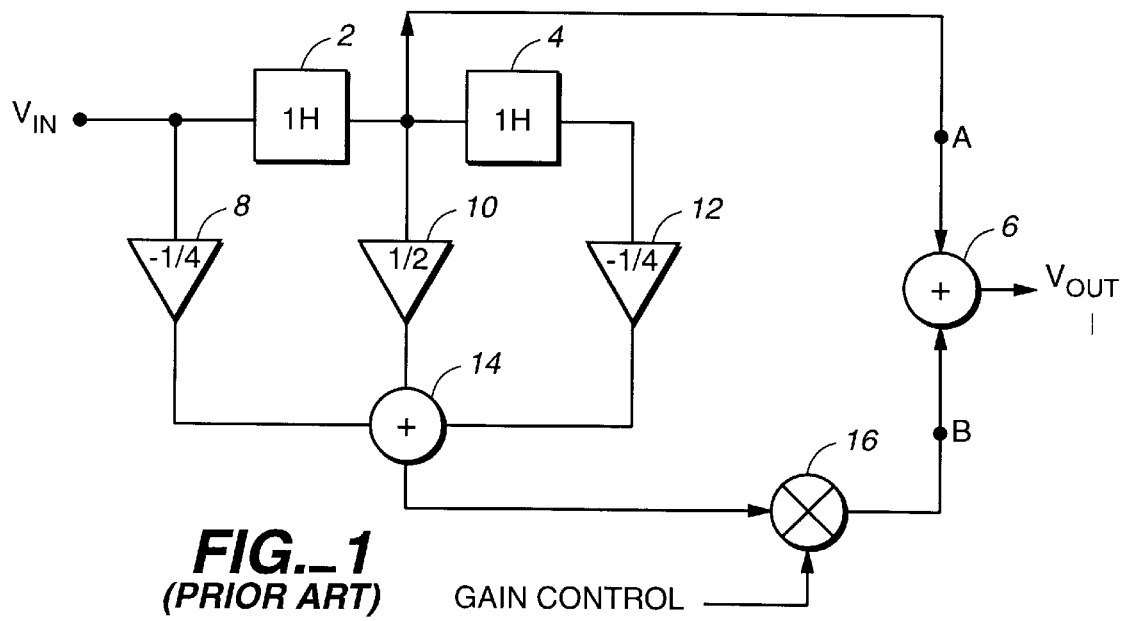
FIG._1
(PRIOR ART)
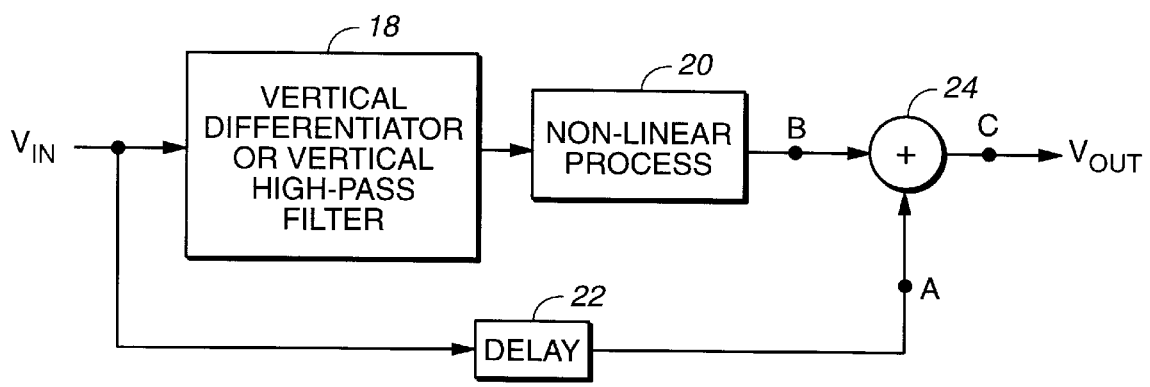
FIG._3

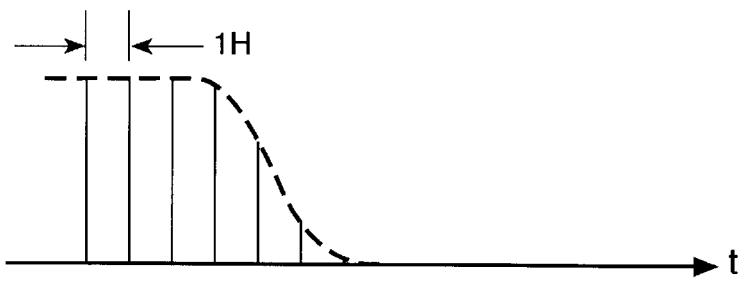
FIG._2A
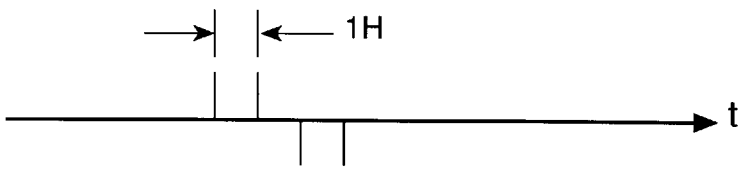
FIG._2B
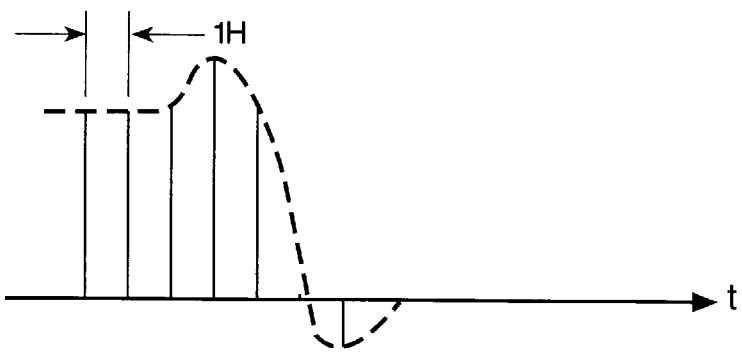
FIG._2C
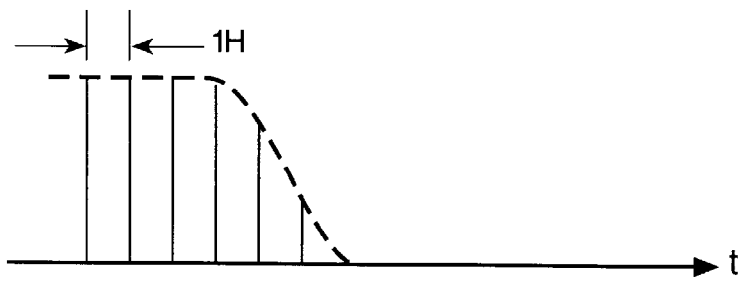
FIG._4A
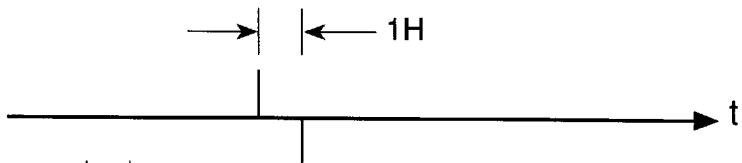
FIG._4B
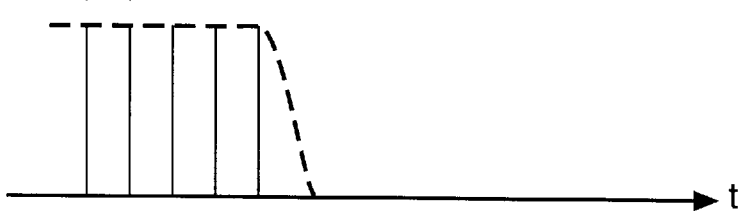
FIG._4C

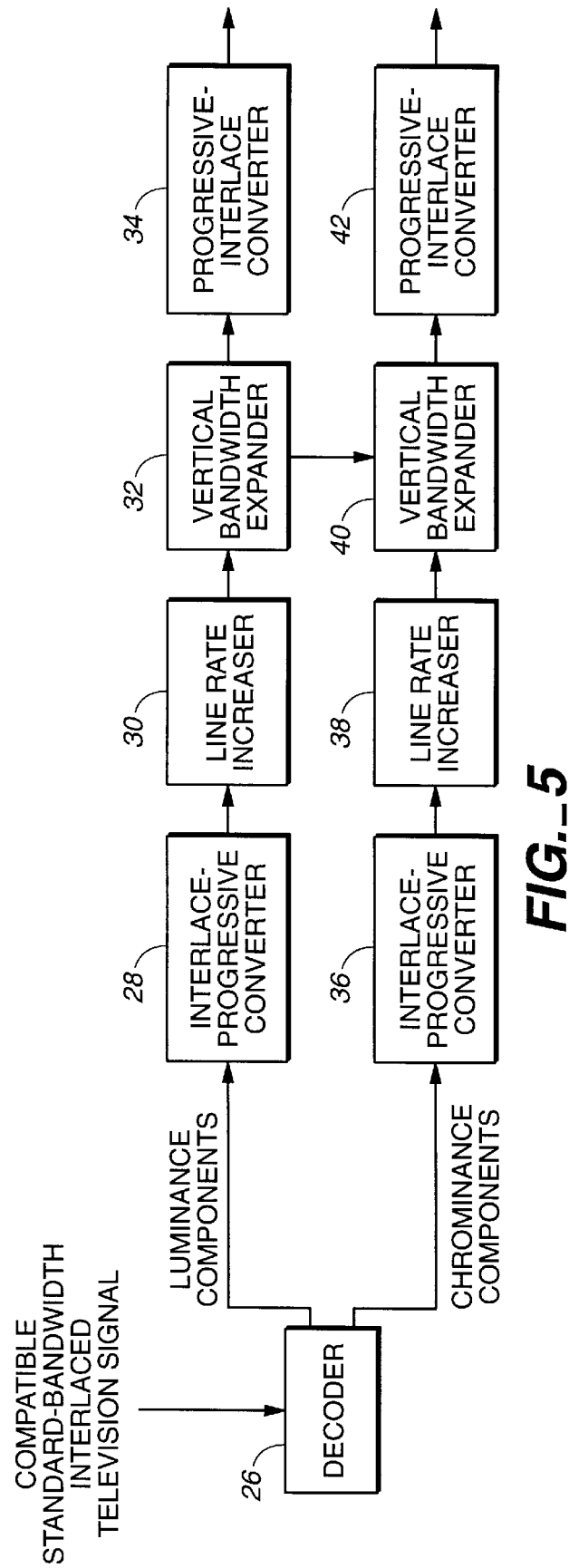
FIG._5

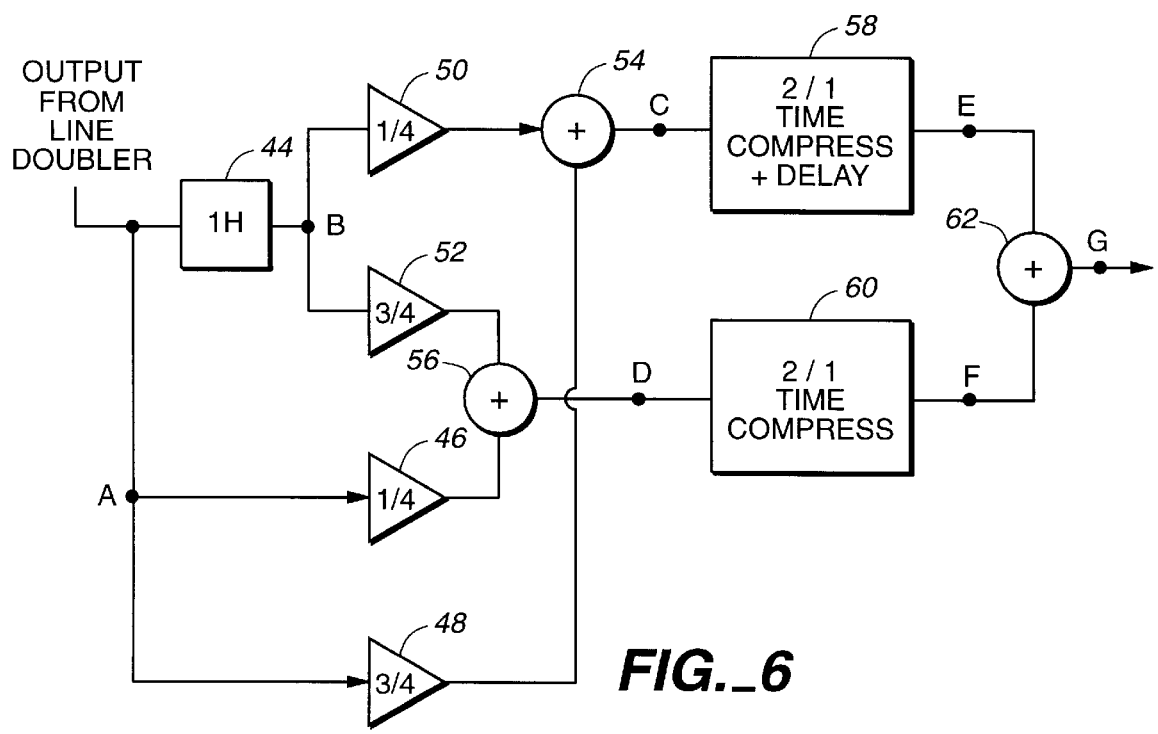
FIG._6
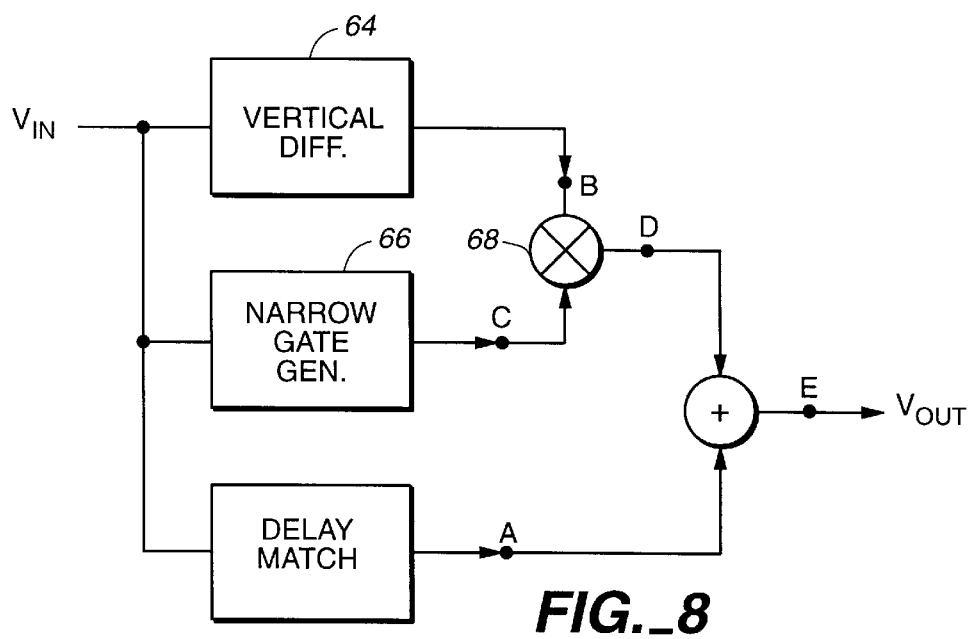
FIG._8

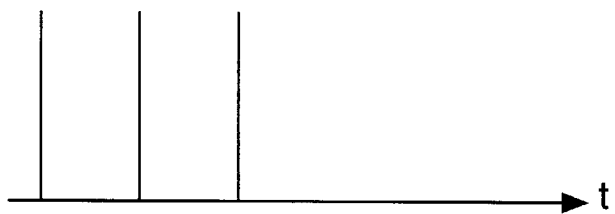
FIG._7A
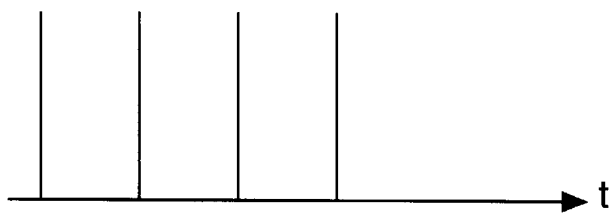
FIG._7B
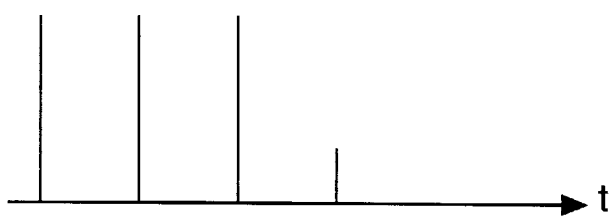
FIG._7C
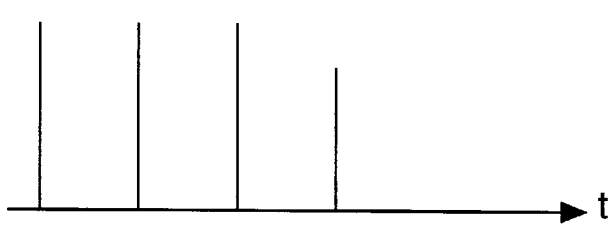
FIG._7D
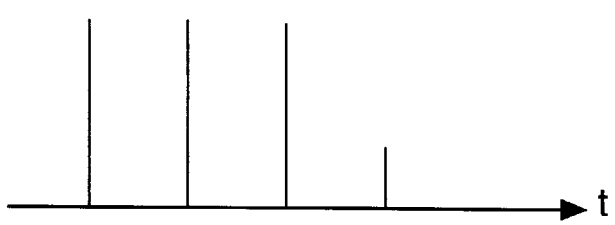
FIG._7E
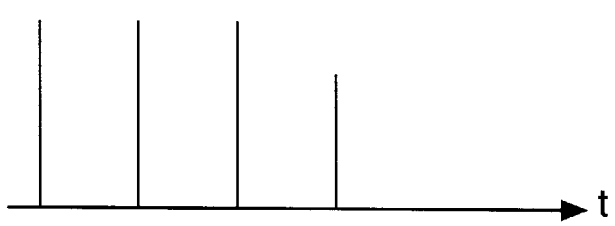
FIG._7F
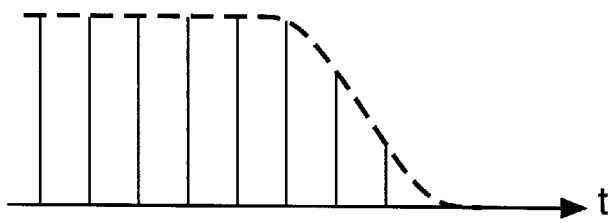
FIG._7G

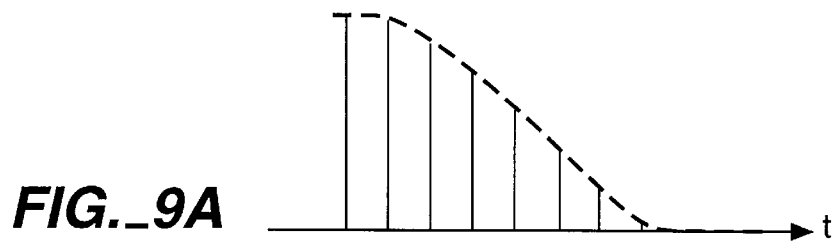
FIG._9A
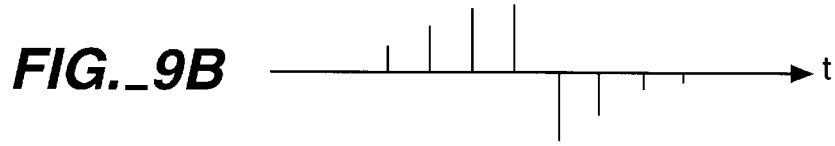
FIG._9B
FIG._9C
FIG._9D
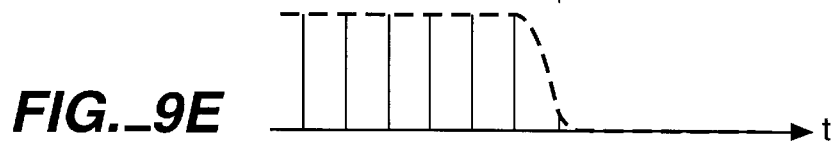
FIG._9E
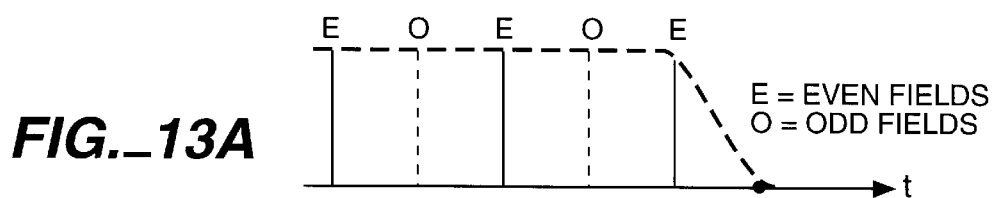
FIG._13A
E = EVEN FIELDS
O = ODD FIELDS
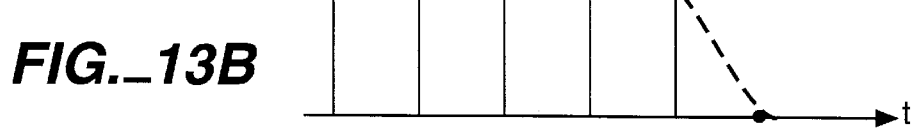
FIG._13B
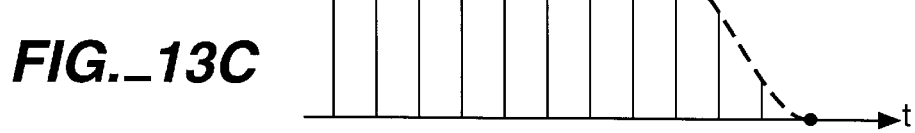
FIG._13C
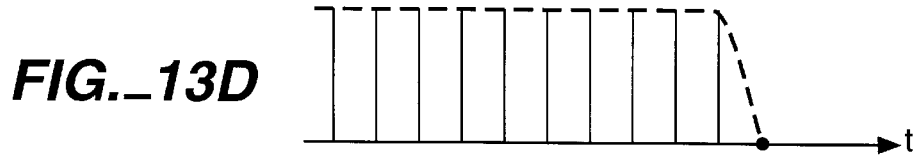
FIG._13D

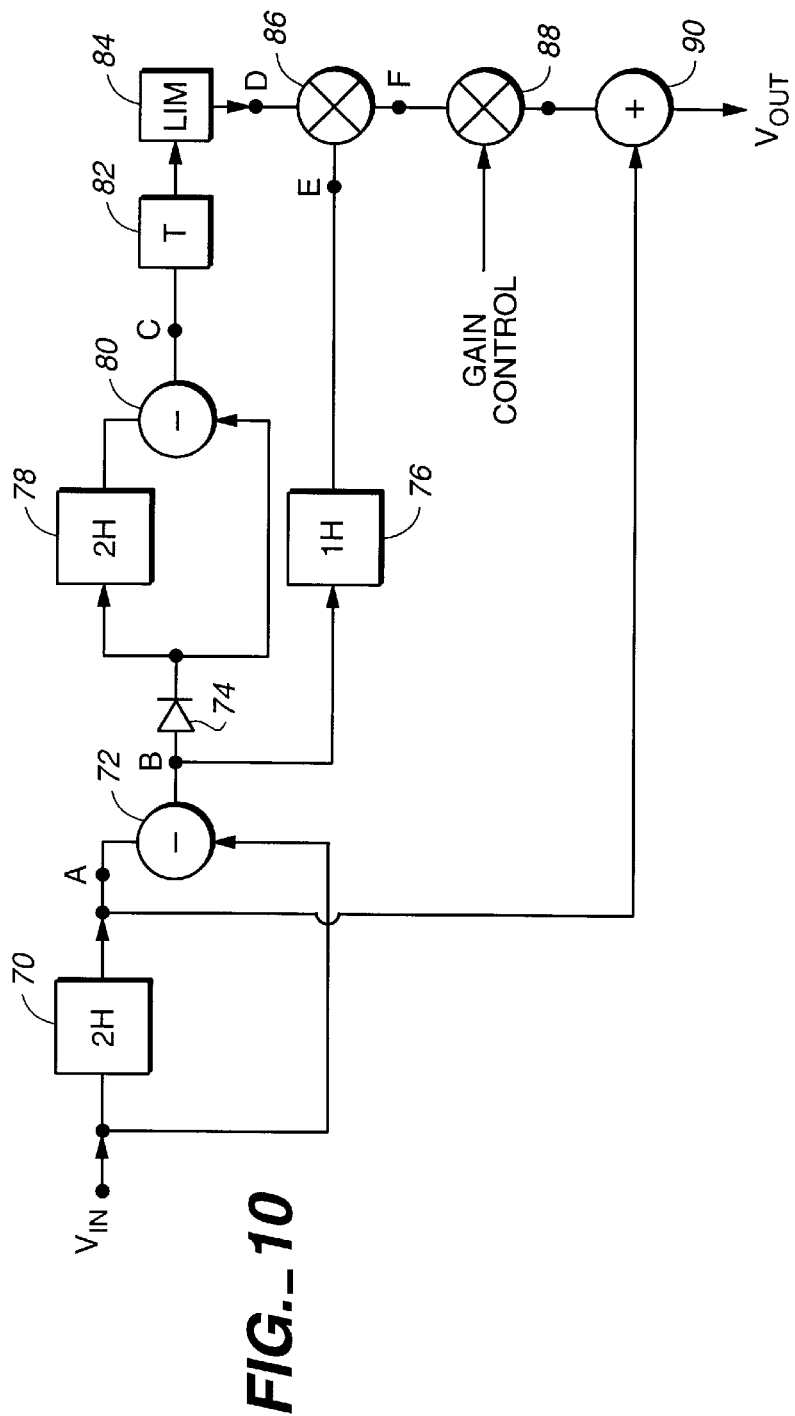
FIG._10
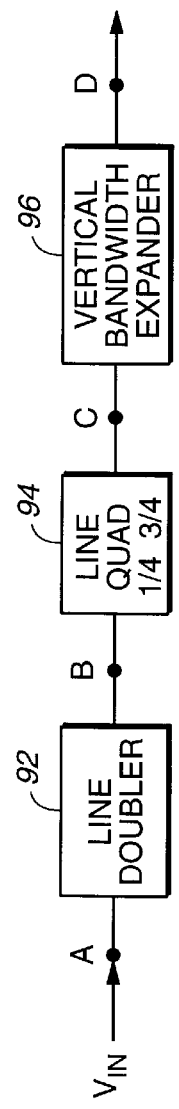
FIG._12

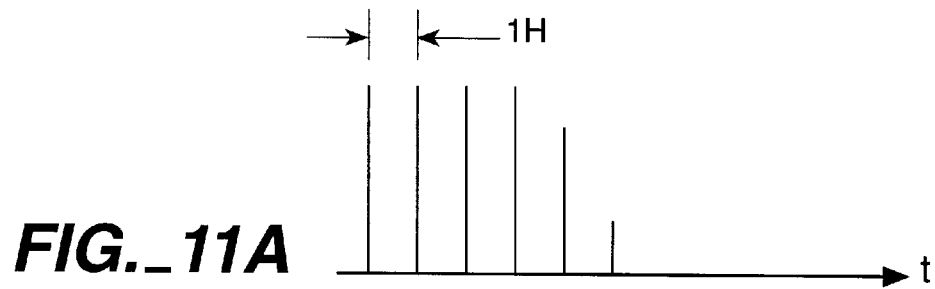
FIG._11A
FIG._11B
FIG._11C
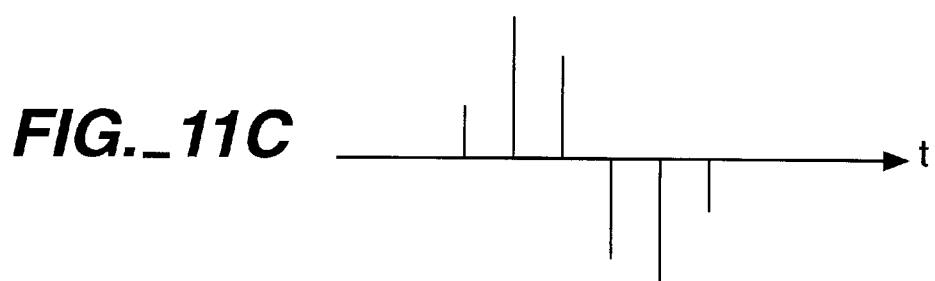
FIG._11D
FIG._11E
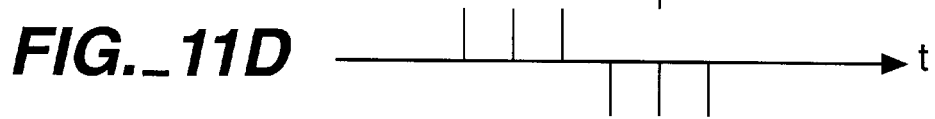
FIG._11F
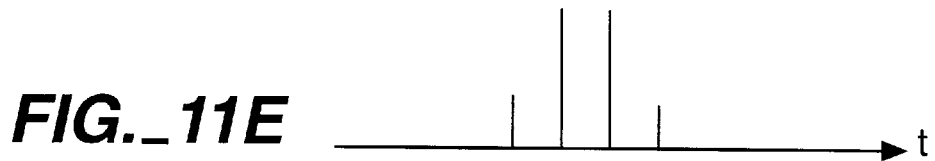
FIG._11G
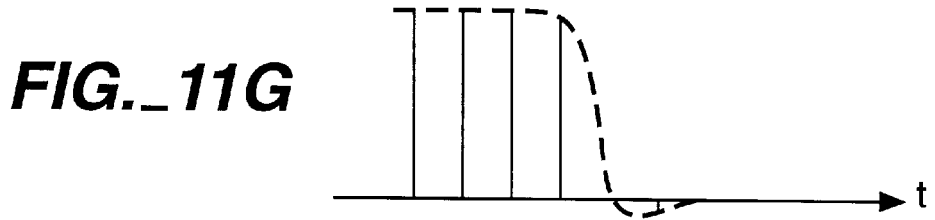

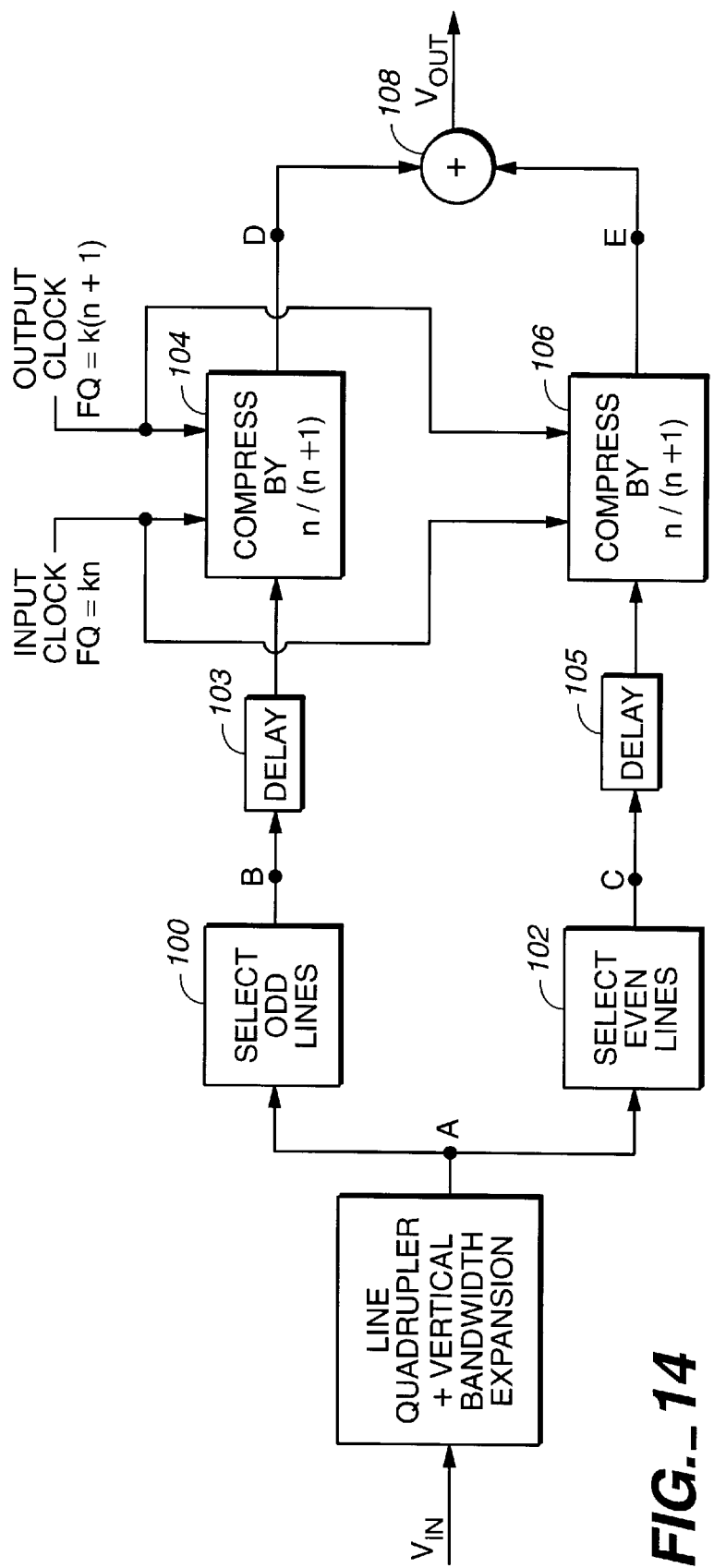
FIG._14

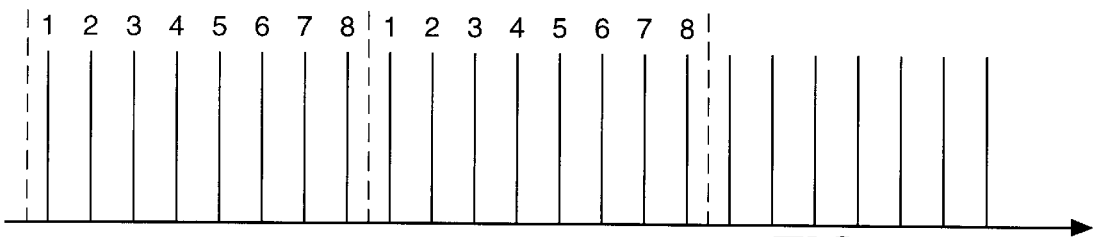
FIG._15A
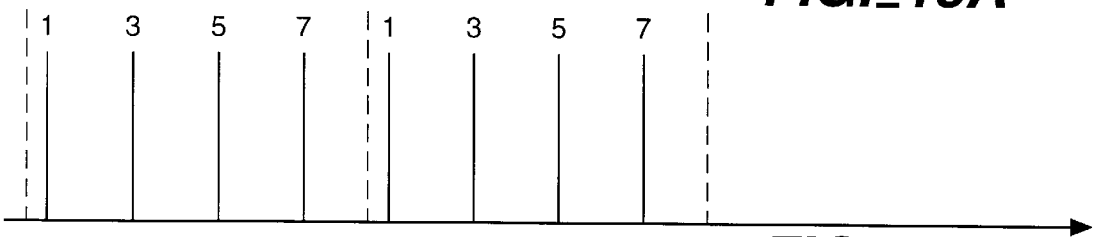
FIG._15B
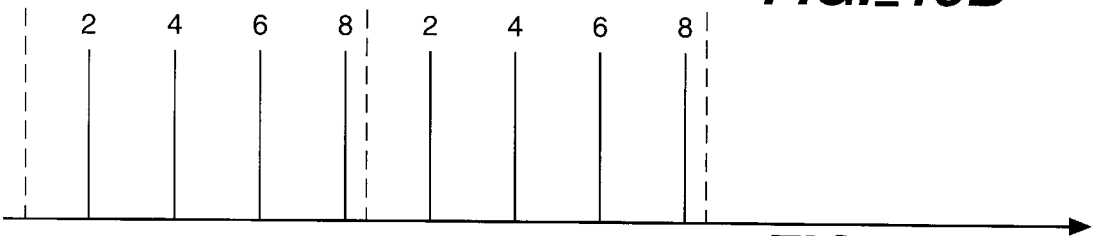
FIG._15C
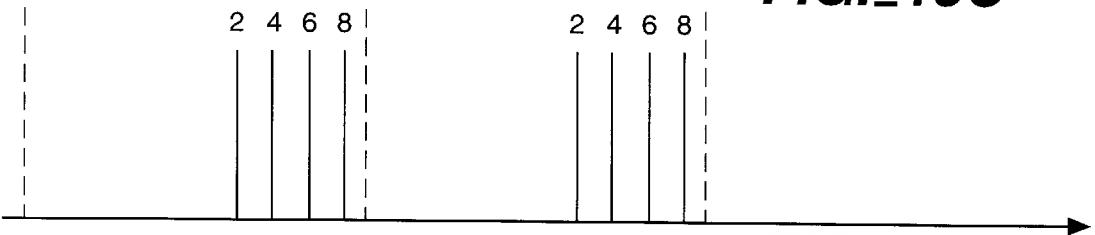
FIG._15E
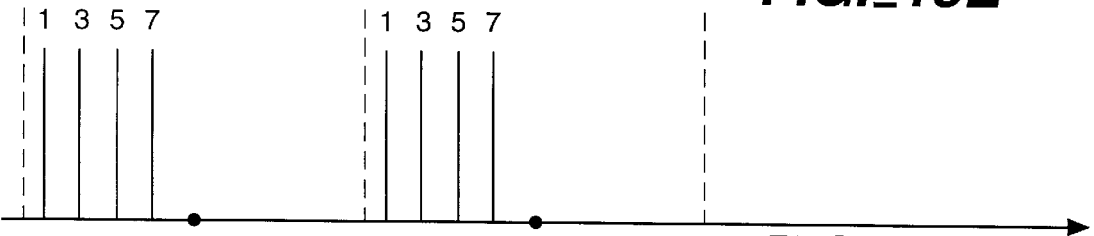
FIG._15D
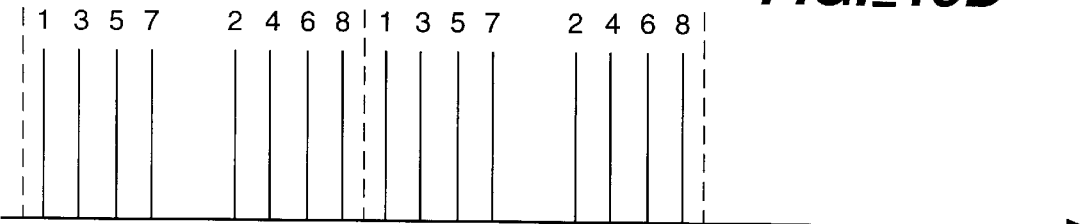
FIG._15F

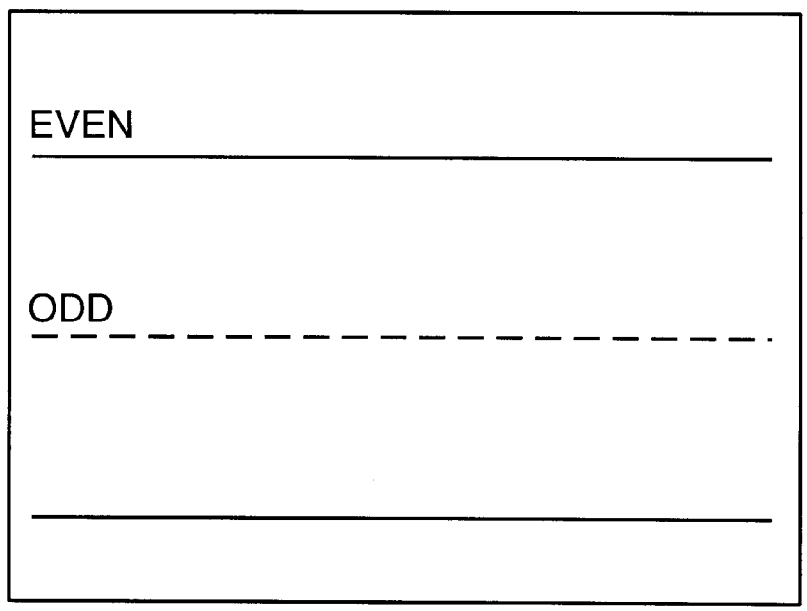
FIG._16
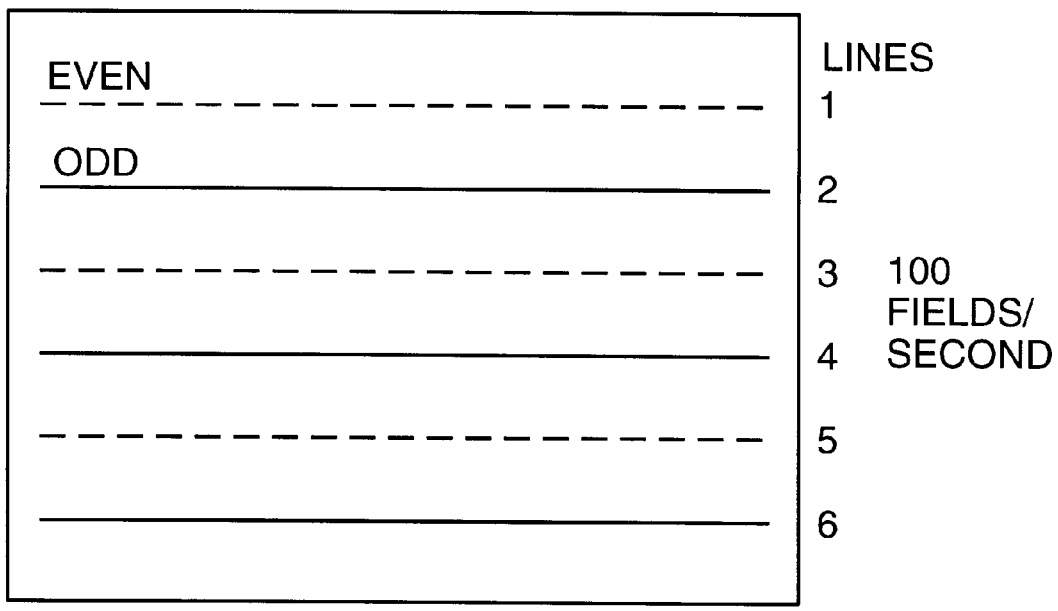
FIG._17

1

NONLINEAR VERTICAL BANDWIDTH EXPANSION OF VIDEO SIGNALS

CROSS REFERENCE TO RELATED APPLICATIONS

This application is a continuation of application of Yves C. Faroudja, "Method and Apparatus for Producing from a Standard-Bandwidth Television Signal a Signal which when Reproduced Provides High-Definition-Like Enhanced Vertical Resolution Video Image Relatively Free of Artifacts," U.S. application Ser. No. 08/561,660, filed Nov. 22, 1995 (Attorney's Docket No. YCF14401), now abandoned, which application is in turn:

(1) a continuation of the provisional application of Yves C. Faroudja, "Method and Apparatus for Producing from a Standard-Bandwidth Television Signal a Signal which when Reproduced Provides High-Definition-Like Enhanced Vertical Resolution Video Image Relatively Free of Artifacts," U.S. application Ser. No. 60/005,114, filed Oct. 12, 1995, Attorney's Docket No. YCF144, now abandoned, and (2) a continuation-in-part of the applications of Yves C. Faroudja and Dong Xu: (a) "Method and Apparatus for Enhancing the Vertical Resolution of a 4:2:0 Format Digital Component Video Signal When Converted to CCIR 601 (4:2:2) Format," filed Oct. 5, 1995, U.S. application Ser. No. 08/539,815, Attorney's Docket No. YCF146, now abandoned and (b) "Method and Apparatus for Enhancing the Vertical Resolution of a Television Signal Having Degraded Vertical Chrominance Transitions," filed Oct. 6, 1995, U.S. application Ser. No. 60/004,905, Attorney's Docket No. YCF14601.

FIELD OF THE INVENTION

The present invention relates to television signal processing. More particularly, the present invention relates to improved signal processing apparatus and methods for deriving from a compatible standard-bandwidth television signal (for example, a standard analog or digitally encoded NTSC or PAL television signal or digitally encoded CCIR 601 4:2:2, 4:2:0, 4:1:1, or 2:1:1 format video signal), a signal which when reproduced provides a more high-definition-like video image relatively free of psychovisually objectionable artifacts.

DESCRIPTION OF RELATED ART

Many arrangements have been proposed for providing enhanced television reproduction while retaining standard analog NTSC or PAL signal transmission for compatibility with standard television receivers. Such arrangements have been described variously as IQTV (Improved Quality Television), HQTV (High Quality Television), IDTV (Improved Definition Television), EDTV (Extended Definition Television), and the like. Analogous problems and solutions have arisen with digitally encoded video signals. For example, the conversion of a CCIR 601 4:2:2 format to a data reduced form for transmission or storage by some downconversion and/or compression technique and the subsequent need to decode and restore the video signal in a way that approaches or exceeds the picture quality of the original format.

In the 1980's, the present inventor developed the SuperNTSC system in which high-definition reproduction was obtained from a compatible analog NTSC signal derived from a high quality progressively scanned source. The system is described, for example, in "Improving NTSC to Achieve Near-RGB Performance," Yves Faroudja and Joseph Roizen, *J. SMPTE*, August 1987, pp. 750–761; "NTSC and Beyond," Yves Charles Faroudja, *IEEE Transactions on Consumer Electronics*, February 1988, pp. 166–177; "A Progress Report on Improved NTSC," Yves C. Faroudja and Joseph Roizen, *J. SMPTE*, November 1989, pp. 817–822 and System Description SuperNTSC, Faroudja Research, Mar. 15, 1990, Sections I, II and IV. For high resolution reproduction, SuperNTSC decoded the compatible composite NTSC signal into components, bandwidth expanded the chroma signal components in the horizontal domain, line doubled the signal components (i.e., doubled the number of lines in each interlaced field or, alternatively, converted the interlaced signal to progressive scan, the progressive scan frame rate corresponding to the interlaced scan field rate and each progressively scanned frame having twice as many scan lines as each interlaced field) and then spectrally expanded the luminance components in the horizontal domain prior to display on a high resolution monitor.

In "On Picture Quality of Some Television Signal Processing Techniques," Broder Wendland and Hartmut Schroeder, *J. SMPTE*, October 1984, pp. 915–922, the authors disclose a system (FIG. 1, line 3) in which a compatible 625 line, 2:1 interlaced television signal, derived from a high quality source, essentially free of aliasing artifacts, is converted from an interlaced to progressively scanned signal, interpolated to double the line frequency, and reconverted to an interlaced scan signal to provide a 1249 line, 2:1 interlaced television signal. Thus, the reproduced line rate and frame rate are each double that of the received compatible signal. A similar approach is described by in "The Television Scanning Process," G. J. Tonge, *J. SMPTE*, July 1984, pp. 657–666.

Wendland and Schroeder also allude to the implementation of "nonlinear enhancement techniques in the vertical direction" (*Id.*, p. 920, right column, top), citing "Picture Enhancement for PAL-coded TV Signals by Digital Processing in TV Receivers," Michael Jacobsen, *J. SMPTE*, February 1983, pp. 164–169. However, the only "nonlinear" enhancement disclosed in the cited reference is a luminance aperture correction arrangement in which the variable addition to the luminance signal, in response to noise level, of a vertical detail signal is derived linearly from three lines of the same field, the detail signal having its amplitude non-linearly weighted. See also the discussion below of prior art aperture correction in connection with FIG. 1.

Despite the substantial improvements resulting from the present inventor's SuperNTSC system and from arrangements such as proposed by Wendland and Schroeder, by Tonge and by others, the resulting television displays still fall short of that which can be obtained by employing a non-compatible wide-bandwidth television signal. In "Digital Compatible HDTV Using Upconverted NTSC Video," Paul A. Snopko and Jong G. Kim, *J. SMPTE*, March 1993, pp. 186–189, an NTSC input is converted from interlaced to non-interlaced scan and the number of vertical lines are increased in order to simulate an HDTV (high-definition television) format. The authors lament that "[u]pconversion of NTSC images to an HDTV format will not yield HDTV resolution, for obvious reasons." (*Id.*, at 187, right column, top).

In "High-Definition Transmission, Signal Processing and Display," William E. Glenn and Karen G. Glenn, *J. SMPTE*, July 1990, pp. 538, 541, the authors describe a system in which a compatible 525-line interlaced NTSC television signal is converted to an 1125 line progressively scanned signal. In order to reconstruct a high-definition signal, a high-frequency vertical detail signal is transmitted in an auxiliary channel and summed with the converted NTSC signal.

In embodiments disclosed in the present inventor's U.S. Pat. Nos. 5,151,783, 5,237,414 and 5,428,398, a standard-bandwidth television signal, such as an NTSC signal is applied to a motion-adaptive line doubler (doubling the number of lines in each interlaced field or, alternatively, converting the interlaced signal to progressive scan such that the progressive scan frame rate corresponds to the interlaced scan field rate and each progressively scanned frame has twice as many scan lines as in each interlaced field), the output of which is then applied to a non-linear enhancer, which includes bandwidth expansion for horizontal and/or vertical picture transitions. However, the present inventor has found that bandwidth expansion for vertical picture transitions following line doubling of a standard-bandwidth television signal produces visually unacceptable aliasing artifacts (e.g., moire patterns). In addition, the above-cited System Description SuperNTSC alludes to a "bandwidth expander for both horizontal and vertical dimension" following a line doubler. However, this is a misstatement—vertical bandwidth expansion was never a feature of SuperNTSC and the detailed block diagrams in the document disclose bandwidth expansion only in the horizontal domain.

Thus, there is a still unfulfilled need for a reproduction system capable of reconstructing a high-definition television signal from a compatible video signal without the production of aliasing artifacts or the requirement to transmit auxiliary signal information.

SUMMARY OF THE INVENTION

In accordance with the teachings of the present invention, (1) the analog or digital components (such as RGB, Y/I/Q, Y/U/V, Y/R-Y/B-Y, Y/Cr/Cb, etc.) of a compatible standard-bandwidth 2-1 interlaced television signal, an analog signal, such as a standard NTSC or PAL television signal or a standard format digital signal, such as a digital representation of a standard NTSC or PAL television signal or a digital video signal in one of the 2:1 interlaced CCIR 601 hierarchical formats, are converted from interlaced to progressive scan, the progressive scan frame rate corresponding to the interlaced scan field rate and each progressively scanned frame having twice as many scan lines as in each interlaced field, the conversion often referred to as "line doubling," (2) the line rate of the progressively scanned signal is increased by interpolation, including appropriate postfiltering (if the line rate of the progressively scanned signal is doubled, the overall effect is often referred to as "line quadrupling" or "line tripling" when the progressively scanned signal scan rate is multiplied by 1.5), and (3) the resulting signal is spectrally expanded in the vertical domain. When the line rate of the progressively scanned signal is doubled, the resulting progressive scan line rate is four times that of the input signal's scan line rate. In order to take advantage of the improved vertical resolution, the resulting television signal should be displayed on a monitor having sufficiently good optical qualities, such as a direct view monitor with a small dot size or a high quality projection system employing three monochrome color tubes.

The present inventor has found that vertical domain spectral expansion applied after interlaced-to-progressive-scan-type line doubling and increasing the line rate of the progressive scan signal allows an apparent increase in vertical resolution in order to better approach an original high-quality source signal while avoiding the production of visually unacceptable aliasing artifacts and without the requirement to transmit an auxiliary detail signal.

Vertical bandwidth enhancement simulates a wide bandwidth vertical detail signal. The vertical detail signal is self-derived from the processed compatible signal itself. Interlaced-to-progressive scan conversion coupled with a sufficient further increase of the scanning lines allows a decrease in the vertical transition rise time to be practical and visible. The degree of vertical spectral expansion should be correlated with the amount of increase in the line rate. Doubling of the line rate allows more vertical spectral expansion without creating undesirable aliasing than does a smaller increase in the line rate. In the frequency domain, scanning produces a series of repeating periodic spectra centered at multiples of the line rate. Vertical bandwidth expansion widens each of the spectra, causing overlapping unless the spectra are initially spaced far enough apart. The present invention is based on the recognition that the spectra are not spaced widely enough to apply bandwidth expansion to a signal which is merely line-doubled (i.e., interlaced-to-progressive scan converted), but that a further increase in line rate, preferably by interpolation, permits self-generated bandwidth expansion without generating aliasing artifacts caused by spectral overlapping.

Spectral or bandwidth expansion in the vertical domain shortens the rise time of vertical transitions, sharpening the transitions without appreciable pre-shoot, overshoot or ringing. Spectral or bandwidth expansion may be provided by a non-linear enhancer which, at least for some signal transition amplitude levels, expands the bandwidth of the applied signal by controlled harmonic distortion of the original spectrum in the vertical domain. Harmonic distortion may be implemented by many forms of non-linear processing, including processing by multiplicative means and by gating means. Such devices are also known in the art by other nomenclature, including "video crispener" and signal processors providing "controlled harmonic generation," "spectral expansion," "shorter rise and fall times without preshoot and overshoot," "multiplicative enhancement" and "gated enhancement."

Examples of prior art spectral expansion are described in U.S. Pat. No. 2,740,071 to Goldmark and Reeves, U.S. Pat. No. 2,851,522 to Hollywood, and in an article by Goldmark and Hollywood entitled "A New Technique for Improving the Sharpness of Television Pictures", *Proceedings of the IRE,* October 1951, p. 1314. An improvement in non-linear spectral expansion techniques is set forth in the present inventor's prior U.S. Pat. No. 4,030,121 and other examples of non-linear signal enhancement are set forth in the present inventor's U.S. Pat. Nos. 4,504,853 and 5,014,119. The process is equally applicable in the horizontal and vertical dimensions, although in the vertical domain the result does not affect the overall signal bandwidth but rather the bandwidth of the periodic line-rate-spaced spectra. In his U.S. Pat. Nos. 5,151,783 and 5,237,414, the present inventor explains how non-linear enhancement may be applied in the vertical domain. Each of the aforementioned United States Patents cited in this paragraph is hereby incorporated by reference in its entirety.

FIG. 1 is a functional block diagram of a prior art vertical enhancer of the "aperture corrector" type which enhances vertical transitions by combining several lines with weighting. Such an arrangement creates overshoots and undershoots. An input video waveform voltage $V_{in}$ is applied to a first one horizontal line (1H) delay 2 and to a second one horizontal line (1H) delay 4. One input to an additive combiner 6 is taken from the junction between the delays 2 and 4. The input is also applied to, for example, a −¼ weighting 8, the junction of delays 2 and 4 is also applied to a +½ weighting 10 and the output of the second delay 4 is also applied to a −¼ weighting 12. The three weighted outputs from elements 8, 10 and 12 are applied to additive combiner 14, the output of which is applied to a variable amplifier/attenuator 16 having a gain control. The controlled output of element 16 provides the other input to combiner 6. The additive combination of the two inputs to combiner 6 provides the corrected output.

Idealized waveforms useful in understanding FIG. 1 are shown in FIGS. 2A–2C. Video signal samples spaced one horizontal line, constituting vertical samples at a particular horizontal line position, are shown with their amplitude on the vertical axis (ordinate) plotted against time t on the horizontal axis (abscissa). The one line delayed video in is shown at FIG. 2A. The FIG. 2A waveform, depicting a negative-going vertical transition, is the first input to combiner 6. The output of element 16 provides the correction signal of FIG. 2B which is the other input to combiner 6. The combiner sums the two inputs to provide the vertically enhanced output shown in FIG. 2C. The enhanced output waveform, although having a shortened fall time, has undesirable overshoot and undershoot characteristics.

FIG. 3 is a functional block diagram showing the basic principle of a prior art vertical bandwidth expander. An input video waveform voltage $V_{in}$ is applied to a block 18 which differentiates the signal or high-pass filters the signal in the vertical domain. The differentiated or filtered signal is applied to block 20 which applies a non-linear bandwidth-expanding process of the type described above. The input signal is also applied to a delay match 22, which has a time delay substantially the same as the time delay through blocks 18 and 20. The outputs of blocks 20 and 22, respectively, are applied to an additive combiner 24 which sums the signals to provide the corrected output.

Idealized waveforms useful in understanding FIG. 3 are shown in FIGS. 4A–4C. As in FIGS. 2A–2C, video signal samples spaced one horizontal line, constituting vertical samples at a particular horizontal line position, are shown with their amplitude on the vertical axis (ordinate) plotted against time t on the horizontal axis (abscissa). FIG. 4A, depicting a negative-going vertical transition, shows the input video waveform voltage $V_{in}$ time delayed by delay match 22. The output of block 20 in response to the FIG. 4A waveform is the non-linear correction signal shown in FIG. 4B, which, when summed with a delayed version of the input signal, provides a corrected output signal depicted in FIG. 4C. The corrected signal displays a decreased transition fall time without any overshoot or undershoot.

Optionally, in accordance with the invention, the spectrally expanded, line increased, progressively scanned signal may then be converted to a 2-1 interlaced scan signal, the interlaced scan frame rate corresponding to the progressive scan frame rate (thus, the interlaced scan field rate is twice the progressive scan frame rate). The resulting frame rate is twice that of the input compatible television signal, reducing perceived flicker in the reproduced picture without making the line structure more apparent than if the signal had remained progressively scanned (the line rate per interlace scanned frame remains the same as the line rate per progressively scanned frame). Although the progressive-to-interlace scan process results in the generation of aliasing artifacts, the most significant artifacts are out of phase from field to field and the high field rate (100 Hz in the case of a PAL system) results in the psychovisual cancellation of those artifacts.

Preferably, the compatible standard-bandwidth signal is produced in a way that minimizes aliasing artifacts. The results obtained by use of the present invention are increasingly impaired as significant aliasing products in the received compatible signal increase. Signals derived from a properly adjusted motion picture film chain source tend to contain less aliasing than television camera derived signals and may provide an acceptable signal without special processing of the source signal. However, if required, techniques for producing an alias-free compatible signal are described in the above-cited journal paper by Wendland and Schroeder and additionally in the following documents: "Signal Processing for New HQTV Systems," Broder Wendland and Hartmut Schroeder, *Television Image Quality,* SMPTE, Scarsdale, 1984, pp. 336–353; "Extended Definition Television with High Picture Quality," Broder Wendlund, *J. SMPTE,* October 1983, pp. 1028–1035; and "High Definition Television Studies on Compatible Basis with Present Standards," Broder Wendland, *Television Technology in the 80's,* SMPTE, Scarsdale, 1983, pp. 151–165.

Although the present invention may be implemented as a television signal processing device to which a compatible standard-bandwidth interlaced television signal is applied, the invention may also be implemented as an add-on to a "line doubler" of the type which converts the interlaced signal to progressive scan, such that the progressive scan frame rate corresponds to the interlaced scan field rate and each progressively scanned frame has twice as many scan lines as in each interlaced field (such as the above-mentioned LD100 Line Doubler). It may also be implemented as an add-on to a line quadrupler or to a combination line doubler/frame doubler.

BRIEF DESCRIPTION OF THE DRAWINGS

FIG. 1 is a functional block diagram of a prior art vertical enhancer of the "aperture corrector" type which enhances vertical transitions by combining several lines with weighting.

FIGS. 2A–2C show idealized waveforms useful in understanding FIG. 1.

FIG. 3 is a functional block diagram showing the basic principle of a prior art vertical bandwidth expander.

FIGS. 4A–4C are idealized waveforms useful in understanding FIG. 3.

FIG. 5 is a functional block diagram of a preferred embodiment of the present invention.

FIG. 6 is a functional block diagram of a preferred form of prior art line increaser for use in the present invention.

FIGS. 7A–7G show idealized waveforms useful in understanding FIG. 6.

FIG. 8 is a functional block diagram showing the general principles of a prior art gating-type vertical bandwidth expander.

FIGS. 9A–9E show idealized waveforms useful in understanding FIG. 8.

FIG. 10 is a functional block diagram of a preferred form of vertical bandwidth expander, a multiplier-type bandwidth expander, for use in the present invention.

FIGS. 11A–11G show idealized waveforms useful in understanding FIG. 10.

FIG. 12 shows, in accordance with the present invention, a functional block diagram of the series relationship of a line doubler (interlace-to-progressive scan converter), a ¼–¾ line quadrupler (line increaser) and a vertical bandwidth expander.

FIGS. 13A–13D show idealized waveforms useful in understanding FIG. 12.

FIG. 14 shows a functional block diagram of one preferred form of scan converter ("frame doubler").

FIGS. 15A–15F show idealized waveforms useful in understanding FIG. 14.

FIG. 16 is a simplified representation of the system's prior art input display.

FIG. 17 is a simplified representation of the system's output display when the optional frame doubler is employed.

DESCRIPTION OF THE PREFERRED EMBODIMENTS

FIG. 5 is a functional block diagram of a preferred embodiment of the present invention in which a compatible, standard-bandwidth, 2-1 interlaced television signal, such as, for example, an analog or digital composite NTSC or PAL television signal, is decoded into components by a decoder 26 and then processed in order to derive a signal which when displayed on a high-quality monitor has enhanced vertical resolution with substantially no psychovisually objectionable artifacts. The decoder is not an integral part of the invention inasmuch as the received analog or digital video signal may already be in component form. Such a received component digital video signal may include, for example, a decoded NTSC or PAL television signal or a digital component video signal in one of the 2:1 interlaced CCIR 601 hierarchical formats, for example.

The configuration of the decoder 26 is not critical. Many types of suitable analog and digital decoders are known in the art. Preferably the decoded signals have well separated luminance and chrominance components. Examples of suitable decoders are disclosed in prior patents of the present inventor, U.S. Pat. Nos. 4,179,705; 4,240,105; 4,706,112; 4,864,389; 4,893,176; and 4,916,526, each of which is incorporated by reference in its entirety.

For simplicity, decoder 26 is shown as having only two outputs: "luminance components" and "chrominance components." In practice there are two chrominance signal components which are often multiplexed in a single channel. Those of ordinary skill in the art will understand that the decoder outputs or input component video signal may be analog or digital components such as RGB (from which luminance and chrominance components may be derived), Y/I/Q, Y/U/V, Y/R-Y/B-Y, Y/Cr/Cb, etc. Furthermore, in the case of digital components, the decoder output or the received digital component video signal may be in any of a number of compressed or uncompressed formats, including, for example, various ones of the digital component video formats in accordance with the recommendations, standards or compression algorithms of the CCIR (International Radio Consultative Committee) (such as the hierarchy of digital video coding formats under CCIR Recommendation 601, the 4:2:2 format often being referred to as a CCIR 601 video signal), ISO/MPEG (the Motion Picture Experts Group of the International Standards Organization), SMPTE (Society of Motion Picture and Television Engineers), EBU (European Broadcasting Union), and/or the recommendations or standards of other industry, governmental or quasi-governmental bodies.

The compatible standard-bandwidth 2-1 interlaced input television signal in both composite and component form may have a line rate of n-lines per frame (625 for PAL, 525 for NTSC), n/2-lines per field (312.5 for PAL, 262.5 for NTSC), with a frame rate of f Hz (25 Hz for PAL, 29.97 for NTSC color) and a field rate of 2f Hz (50 Hz for PAL, 59.94 Hz for NTSC color). The luminance component signals are first applied to an interlace-to-progressive (I/P) scan converter (or "line doubler") 28 which provides at its output a progressively scanned signal having n-lines per frame at a frame rate of 2f Hz.

The output of I/P scan converter 28 is applied to a line-rate increaser 30 which provides at its output a progressively scanned signal having kn-lines per frame at a frame rate of 2f Hz. The coefficient "k" is the line rate multiplication factor which is greater than one and is preferably large enough to permit enough vertical bandwidth expansion to provide a psychovisual improvement in vertical resolution without causing psychovisually displeasing aliasing artifacts. Although it is preferred that the coefficient "k" be in the order of 1.5 or 2, the exact value of "k" is not critical. Thus, when k is 2, the resulting signal has 2n-lines per frame, a rate of four times the original number of lines per interlaced field (a line "quadrupler").

The output of line-rate increaser 30 is applied to a vertical bandwidth expander 32 which shortens the rise time of vertical transitions thus psychovisually enhancing vertical detail in the reproduced picture. Preferably, in order to reduce perceived flicker, the output of vertical bandwidth expander 8 may be applied to a progressive-to-interlace (P/I) scan converter (or "frame doubler") 34 prior to display. Optionally, the P/I scan converter may be omitted. If used, the output of P/I scan converter 10 is a 2-1 interlaced signal having kn lines/frame, kn/2 lines/field, a 2f Hz frame rate and a 4f Hz field rate. Thus, the output frame and field rates are doubled with respect to those of the compatible input signal.

Chrominance signal components are also processed in the same manner in a separate path by an interlace-to-progressive (I/P) scan converter 36 and a line-rate increaser 38. Although such processing may be omitted, it is preferred that the chrominance signal components are also bandwidth expanded in the vertical domain. If this processing is included, it is preferred that the chrominance vertical bandwidth expansion is controlled by luminance vertical bandwidth transitions because of the robustness of the luminance signal components.

Vertical bandwidth expander 32, operating on luminance signal components, includes a vertical transition detector which controls its own action. The detector control signal in expander 32 may also be applied to a chrominance vertical bandwidth expander 40 in order to control the bandwidth expansion action of chrominance expander 40 in response to luminance transitions. The use of luminance transitions to sharpen corresponding chroma transitions in the horizontal domain is disclosed in prior U.S. Pat. Nos. of the present inventor: 4,030,121 and 4,504,853, each of which is incorporated by reference in its entirety. Alternatively, the chrominance components vertical bandwidth expander 40 may have its own chrominance transition detector, thus operating independently of the luminance components vertical bandwidth expander 32. As a further alternative, the chrominance components vertical bandwidth expander 40 may have its own chrominance transition detector but operate in cooperation with the luminance vertical transition detector such that detected chrominance transitions control chrominance vertical bandwidth expansion only when a chrominance transition occurs in the absence of a concurrent luminance transition.

Finally, as in the luminance path, an optional progressive-to-interlace (P/I) scan converter 42 receives the bandwidth expander 40 output.

Alternatively, vertical bandwidth expansion may be provided only for luminance signal components, in which case the chrominance components signal path having blocks 36, 38, 40 and 42 is omitted. As a further alternative, vertical bandwidth expansion may be provided only for chrominance signal components, in which case there are two sub-alternatives: (1) control of the chrominance components vertical bandwidth expander is derived from luminance vertical transitions, thus requiring the retention of blocks 28 and 30 and the transition detector portion of block 32, and (2) control of the chrominance components vertical bandwidth expander is derived from chrominance transitions, thus allowing blocks 28, 30, 32 and 34 in the luminance components path to be omitted.

The I/P converters 28 and 36, as discussed above, are often referred to as "line doublers." The I/P converters may be identical and, preferably, are implemented in accordance with the teachings of one or more of the present inventor's prior patents, including U.S. Pat. Nos. 4,876,596; 4,967,271; 4,982,280; 4,989,090; 5,259,451; and 5,291,280, each of which is incorporated by reference in its entirety, or in accordance with the present inventor's published International Patent Application WO 94/30006. It is preferred that the I/P converters 28 and 36 each include the "film mode" capabilities disclosed in U.S. Pat. No. 4,982,280 or International Publication WO 94/30006. A suitable commercially available product is the Model LD100 Line Doubler, marketed by Faroudja Laboratories, Inc. of Sunnyvale, Calif. The particular arrangement for I/P conversion is not critical. Various other arrangements for performing I/P conversion are well known in the art and may be employed.

The line rate increasers 30 and 38 may be identical and, preferably, increase the line rate by interpolation rather than line duplication. In addition, as is well known, the line rate increasers 30 and 38 include appropriate anti-aliasing post-filtering having a filter bandwidth commensurate with the amount of the line increase. See, for example, the papers cited above by Wendland, Wendland and Schroeder, and Tonge. In the digital domain, the line increaser is accomplished by vertical upsampling and filtering. One preferred form of line increaser providing a doubling of the progressive scan lines (thereby resulting in line "quadrupling") is shown in the functional block diagram of FIG. 6 which provides a ¼-¾ interpolation weighting. The output of the I/P converter (line doubler) 28 provides the line increaser's input which is applied to a one horizontal line (1H) delay 44 and to the input of a ¼ weighter 46 and a ¾ weighter 46.

FIGS. 7A–7G show idealized waveforms useful in understanding FIG. 6 and they will be referred to as FIG. 6 is described. Video signal samples spaced one horizontal line, constituting vertical samples at a particular horizontal line position, are shown with their amplitude on the vertical axis (ordinate) plotted against time t on the horizontal axis (abscissa). FIG. 7A, the input, shows a negative-going vertical transition and FIG. 7B, the one-line delayed version thereof.

The output of 1H delay 44 is applied to a further ¼ weighting 52 and to a further ¾ weighting 54. The weighting 48 and 50 outputs are summed in an additive combiner 54 to provide the waveform shown in FIG. 7C. The weighting 46 and 52 outputs are summed in an additive combiner 56 to provide the waveform shown in FIG. 7D. The FIG. 7C waveform from combiner 54 is applied to a ⅔ time compressor and delay 58 to provide at its output the waveform of FIG. 7E. The FIG. 7D waveform from combiner 56 is applied to a ⅔ time compressor 60 to provide at its output the waveform of FIG. 7F. The effect of the time compressors is not seen in the idealized FIGS. 7E and 7F which do not depict the time duration of a line. The delay in block 58 provides in the centering of the vertical samples from combiner 54 between the samples from combiner 56. The outputs of blocks 58 and 60 are summed in an additive combiner 62 to provide the "line quadrupled" output.

The vertical bandwidth expanders 32 and 40 may be identical except that expander 40 may omit a vertical transition detector and use the vertical transition detection signal generated in expander 32. As explained above, spectral or bandwidth expansion may be provided by a non-linear enhancer with, at least for some signal transition amplitude levels, expands the bandwidth of the applied signal by controlled harmonic distortion of the original spectrum in the vertical domain. The configuration of the vertical bandwidth expander is not critical, although the non-linear vertical enhancers described in the above-cited U.S. Pat. Nos. 4,262,304, 5,151,783 and 5,237,414 are preferred. FIG. 2 and the related waveforms of FIGS. 3A–3C, described above, explain the principle of a vertical bandwidth expander.

The general principles of a gating-type vertical bandwidth expander is shown in the functional block diagram of FIG. 8. FIGS. 9A–9E show idealized waveforms useful in understanding FIG. 8 and they will be referred to as FIG. 8 is described. Video signal samples spaced one horizontal line, constituting vertical samples at a particular horizontal line position, are shown with their amplitude on the vertical axis (ordinate) plotted against time t on the horizontal axis (abscissa). FIG. 9A, depicting a negative-going vertical transition, shows a time-delayed version of the input video waveform voltage $V_{in}$. The input signal is applied to a vertical differentiator 64 to provide an output at point B having the waveform shown in FIG. 9B in response to a delay-matched version of the negative-going vertical transition input signal. The input signal is also applied to a narrow gate generator 66 which generates a gating signal at its output point C, shown in FIG. 9C, having a period of about four vertical lines in response to the onset of a negative-going or positive-going vertical transition. The gate generator 66 output controls a multiplier 68 so that only a portion of the vertical differentiator 64 output is passed to the multiplier output at point D, shown in the waveform of FIG. 9D. The gated correction signal at point D is summed with the delayed version of the input signal, shown in the waveform of FIG. 9A, in order to provide the corrected output signal $V_{out}$ at point E, shown in the waveform of FIG. 9E. The resulting output has a shorter fall time, about one vertical line versus about five or six vertical lines in the input signal.

A functional block diagram of a preferred form of vertical bandwidth expander embodiment is shown in FIG. 10. FIGS. 11A–11G show idealized waveforms useful in understanding FIG. 10 and they will be referred to as FIG. 10 is described. Video signal samples spaced one horizontal line, constituting vertical samples at a particular horizontal line position, are shown with their amplitude on the vertical axis (ordinate) plotted against time t on the horizontal axis (abscissa). FIG. 11A, depicting a negative-going vertical transition, shows a time-delayed version of the input video waveform voltage $V_{in}$. The input signal $V_{in}$ is applied to a two horizontal line (2H) delay 70 to provide an output at point A, shown in the waveform of FIG. 11A, which is applied to one input of a subtractive combiner 72. The undelayed input signal is applied to the other input of combiner 72 to provide an output at point B, shown in the waveform of FIG. 11B, which is the difference between the undelayed and 2H delayed input signal. Blocks 70 and 72 function as a vertical differentiator. The output of combiner 72 is applied to the input of a rectifier 74, which removes the sign of the differentiated positive-going and negative-going transitions, and to a one horizontal line (1H) delay 76. Alternatively, rectifier 74 may be located in the input to block 76. The output of rectifier 74 is applied to a further 2H delay and subtractive combiner arrangement, 78 and 80, which also function as a vertical differentiator, the output of which at point C has a waveform shown in FIG. 11C. That output may be applied to a threshold 82 which may reduce signals below a selected threshold in order to avoid enhancing noise when the signal quality is marginal, and to a limiter 84 which limits the amplitude of the thresholded signals to provide an output at point D, shown in the waveform of FIG. 11D. Optionally, threshold 82 may be omitted. Signal D constitutes a three-level (i.e., 0, +1, −1) switching waveform. The output at point D is applied as one input to one input of a four-quadrant linear (8 bit by 8 bit) multiplier 86. The delay matched vertical first differential signal at the output of 1H delay at point E, shown in the waveform of FIG. 11E, is applied as the other input to multiplier 86, resulting in the correction signal output at point F, shown in the waveform of FIG. 2F. The amplitude of the correction signal may be varied by applying it to a further multiplier 88 which has a gain control so that the amplitude of the correction signal may be varied. The gain adjusted control signal is summed with the 2H delayed input signal in additive combiner 90 to provide the output signal $V_{out}$ shown in the waveform of FIG. 11G. The output waveform shows a very small amount of overshoot and undershoot which is not visible in the displayed picture.

In accordance with the present invention, FIG. 12 shows in a functional block diagram the series relationship of a line doubler (interlace-to-progressive scan converter) 92, a ¼–¾ line quadrupler (line increaser) 94 and a vertical bandwidth expander 96. FIGS. 13A–13D show idealized waveforms useful in understanding FIG. 12 and they will be referred to as FIG. 12 is described. Video signal samples spaced one horizontal line, constituting vertical samples at a particular horizontal line position, are shown with their amplitude on the vertical axis (ordinate) plotted against time t on the horizontal axis (abscissa). The 2-1 interlaced scan video signal input is shown at FIG. 13A as having alternating lines from "even" and "odd" (in analog television parlance) fields. When converted to progressive scan by the line doubler 92, the samples are then from the same progressively scanned frame. The line quadrupler upsamples the vertical scanning rate. The ¼–¾ "quadrupler" doubles the vertical scanning rate to provide the waveform shown in FIG. 13C. The vertical bandwidth expander 96 enhances the vertical transition by shortening the transition fall time from about four vertical lines to one vertical line.

The progressive-to-interlace scan converters 34 and 42 may be identical. Such converters are well known in the art and the particular configuration of the converter is not critical. One preferred form of scan converter ("frame doubler") is shown functionally in FIG. 14.

FIGS. 15A–15F show idealized waveforms useful in understanding FIG. 14 and they will be referred to as FIG. 14 is described. Video signal samples spaced one horizontal line, constituting vertical samples at a particular horizontal line position, are shown with their amplitude on the vertical axis (ordinate) plotted against time t on the horizontal axis (abscissa). The waveforms of FIGS. 15A–15F are intended to show timing and line-to-frame and line-to-field relationships. For simplicity, the drawings depict a hypothetical, but easy to understand, standard of eight lines per frame after quadrupling.

The output of a line quadrupler 98 (such as line rate increaser 30 or 38 functioning to double the number of progressive scan lines) at point A is shown as the waveform of FIG. 15A in which progressively scanned lines 1 through 8 occur in sequential frames. In practice, the signal at point A has n lines per field. The progressively scanned lines are separated into odd lines 1, 3, etc. and even lines 2, 4, etc. by blocks 100 and 102, respectively, to provide the waveforms at FIGS. 15B and 15C, respectively. A first frame compressor, consisting of a time delay 103 and a time compressor 104, implemented as a first-in, first-out memory with an input clock frequency kn and an output clock frequency k(n+1), receives the odd scan line samples, modifies their timing relationship so that they occur over a shorter period of time and delays the compressed odd scan line samples so that the sample for line 1 occurs one frame later with the remaining samples following during only about the first half of the frame as shown in the waveform of FIG. 15D. A second frame compressor, consisting of a time delay 105 and a time compressor 106, also implemented as a first-in, first-out memory with an input clock frequency kn and an output clock frequency k(n+1), receives the even scan line samples, modifies their timing relationship so that they occur over a shorter period of time and delays the compressed even scan line samples so that the sample for line 2 occurs about one and one half frames later with the remaining samples following during only about the second half of the frame as shown in the waveform of FIG. 15E. The time compression in blocks 104 and 106 is very small (e.g., 1250/1251) and is used only for achieving proper interlace with an odd number of lines per frame. In this example, a blank line is added; however, a line could be subtracted instead. The outputs of blocks 104 and 106 are summed in an additive combiner 108 which provides at its output at point F the waveform shown in FIG. 15F, a line doubled, frame doubled 2-1 interlaced output. Thus, the original progressive scan frame (or field, a field and frame being the same), becomes an interlaced scan frame made up of two interlaced fields, an odd field and an even field. New vertical sync pulses are added (by means not shown) between every field. In order to obtain proper 2-1 interlacing, while keeping the same time interval between two consecutive vertical synchronizing pulses (even to odd and odd to even), a slight time compression is performed in both signal paths. In the case of a 1250 line, 50 Hz progressively scanned video signal from line quadrupler 98, the relative time compression of both devices is 1250/1251. The output at point F is then 1251 lines per ⅟₅₀ second or 625.5 interlaced lines per ⅟₁₀₀ second. It is also possible to time expand the signal in both signal paths instead of applying time compression. For example, if the clock ratio is 1250/1249, the output at point F is then 1249 lines per ⅟₅₀ second or 624.5 interlaced lines per ⅟₁₀₀ second.

Thus, in practice, the signal at point F has (n+1)/2 lines per field (or, if compression is replaced by expansion n/(n−1) in blocks 104 and 106, then (n−1)/2 lines per field. The output display in both cases is as shown in the simplified depiction of FIG. 17 in which only six interlaced lines are shown having a 100 field/second frame rate. A simplified representation of the system's input display is shown in FIG. 16 as having three interlaced lines having a 50 field/second frame rate.

The enhancement techniques in accordance with the present invention may be supplemented by other enhancement techniques, for example the techniques of the present inventor's U.S. Pat. No. 5,237,414 in which spectral expansion is provided for high signal levels and linear processing for low levels and/or other processing as desired, including, for example, enhancement in the horizontal domain.

The present invention may be implemented using analog, digital, hybrid analog/digital and/or digital signal processing in which functions are performed in software and/or firmware.

I claim:

1. A method for enhancing the vertical resolution of a progressively scanned television signal, comprising increasing the line rate of the progressively scanned television signal, such that, in the frequency domain, the spacing between the repeating period spectra centered at multiples of the line rate is increased, and spectrally expanding in the vertical domain the increased line rate television signal, the degree of said spectral expansion being correlated with the amount of the line rate increase such that the increased bandwidth of the periodic line-rate-spaced spectra does not result in substantial overlapping of the periodic line-rate-spaced spectra.

2. A method according to claim 1 further comprising converting the spectrally expanded increased line rate progressively scanned television signal to a frame doubled 2-1 interlaced television signal, such that for a progressive scan input having kn lines/frame at a frame rate of 2f Hz, the interlaced output has about kn lines/frame and about kn/2 lines/field at a frame rate of 2f Hz and a field rate of 4f Hz.

3. A method according to claim 1 or claim 2 wherein the line rate is increased by a factor of about 1.5 to 2.

4. A method for enhancing the vertical resolution of a 2-1 interlaced television signal, comprising converting the 2-1 interlaced television signal to a progressively scanned television signal, increasing the line rate of the television signal, such that, in the frequency domain, the spacing between the repeating period spectra centered at multiples of the line rate is increased, and spectrally expanding in the vertical domain the increased line rate television signal, the degree of said spectral expansion being correlated with the amount of the line rate increase such that the increased bandwidth of the periodic line-rate-spaced spectra does not result in substantial overlapping of the periodic line-rate-spaced spectra.

5. A method according to claim 4 further comprising converting the spectrally expanded increased line rate progressively scanned television signal to a frame doubling 2-1 interlaced television signal, such that for a progressive scan input having kn lines/frame at a frame rate of 2f Hz, the interlaced output has about kn lines/frame and about kn/2 lines/field at a frame rate of 2f Hz and a field rate of 4f Hz.

6. A method according to claim 4 or claim 5 wherein the line rate is increased by a factor of about 1.5 to 2.

7. The method of claim 1 or claim 4 wherein the increase in line rate is large enough to permit enough vertical bandwidth expansion to provide a psychovisual improvement in vertical resolution without causing psychovisually displeasing aliasing artifacts resulting from overlapping of the periodic line-rate-spaced spectra.

* * * * *